(12) United States Patent
Grinberg

(10) Patent No.: US 9,070,029 B2
(45) Date of Patent: Jun. 30, 2015

(54) SYSTEM AND METHOD FOR EXTENDING RANGE OF RADIO FREQUENCY IDENTIFICATION (RFID) SIGNAL COMMUNICATIONS

(75) Inventor: Anatoly Grinberg, Brighton, MA (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 941 days.

(21) Appl. No.: 13/169,168

(22) Filed: Jun. 27, 2011

(65) Prior Publication Data
US 2012/0326842 A1 Dec. 27, 2012

(51) Int. Cl.
G06K 7/01 (2006.01)
G06K 7/10 (2006.01)

(52) U.S. Cl.
CPC .................. G06K 7/10178 (2013.01)

(58) Field of Classification Search
CPC .......... G06K 17/0022; G06K 17/0029; G06K 19/0723; G06K 19/07749; G06K 2017/0041; G08G 1/02; G01V 15/00
USPC ......... 340/572.7, 941, 933, 572.1, 10.4, 10.1; 235/385, 451, 375, 439; 333/167
See application file for complete search history.

(56) References Cited

U.S. PATENT DOCUMENTS

| | | | |
|---|---|---|---|
| 6,724,308 B2 * | 4/2004 | Nicholson .................. | 340/572.1 |
| 6,839,035 B1 | 1/2005 | Addonisio et al. | |
| 6,894,224 B2 * | 5/2005 | Kobayashi et al. ......... | 174/74 R |
| 7,432,817 B2 * | 10/2008 | Phipps et al. .............. | 340/572.7 |
| 8,840,023 B2 * | 9/2014 | Chauvet ..................... | 235/439 |
| 2006/0208899 A1 * | 9/2006 | Suzuki et al. ............... | 340/572.7 |
| 2006/0255140 A1 * | 11/2006 | Jusas et al. .................. | 235/451 |
| 2007/0007338 A1 * | 1/2007 | Pacorich et al. ............. | 235/385 |
| 2007/0222603 A1 * | 9/2007 | Lai et al. .................... | 340/572.7 |
| 2007/0262868 A1 * | 11/2007 | Westrick et al. ........... | 340/572.7 |
| 2010/0123559 A1 * | 5/2010 | Wilkinson et al. .......... | 340/10.4 |

OTHER PUBLICATIONS

Rockwell Automation; Cadet 3 Tongue Interlock Switches; http://ab.rockwellautomation.com/Sensors-Switches/Safety-Interlock-Switches/Cadet-3-Tongue-Interlock-Switches; admitted prior art because believed to have been published at least as early as 2000; 1 page.

(Continued)

*Primary Examiner* — Steven Lim
*Assistant Examiner* — Kaleria Knox
(74) *Attorney, Agent, or Firm* — Whyte Hirschboeck Dudek S.C.

(57) ABSTRACT

Systems and methods for extending the range of radio frequency identification (RFID) signal communications, including related sensing systems, are disclosed. In one embodiment, the system facilitates wireless communications between a RFID reader device and RFID transponder device and includes an extender circuit. The extender circuit includes a first tank circuit including a first inductor connected in parallel with a first capacitor between first and second nodes, and a second tank circuit including a second inductor connected in parallel with a second capacitor between third and fourth nodes. The extender circuit includes a first connection including a resistor, the first connection linking the first and third nodes, and a second connection between the second and fourth nodes, where the second and fourth nodes are at or substantially at a common voltage. In at least some additional systems, the extender circuit is implemented in combination with an RFID reader or transponder device.

25 Claims, 5 Drawing Sheets

(56) References Cited

OTHER PUBLICATIONS

Rockwell Automation; MT-GD2 Tongue Interlock Switches; http://ab.rockwellautomation.com/Sensors-Switches/Safety-Interlock-Switches/MT-GD2-Tongue-Interlock-Switches; admitted prior art because believed to have been published at least as early as 2000; 1 page.

Rockwell Automation; Publication 440N-Z-P001B-EN-P; Product Profile—SensaGuard RFID Non-Contact Safety Switches; admitted prior art because believed to have been published at least as early as 2008; 4 pages.

Rockwell Automation; Publication EUSAFE-BR001C-EN-P; Integrated Safety—Safety Interlock Switches; admitted prior art believed to have been first published as early as 2006, notwithstanding indicated publication date of Jun. 2010; 2 pages.

Rockwell Automation; Publication S117-CA001A-EN-P; Interlock Switches Overview; admitted prior art because believed to have been published at least as early as 2000; 2 pages.

Chip RFID: Main Operating Frequencies presentation; IDTechEx; admitted prior art because believed to have been published prior to 2006; 3 pages.

* cited by examiner

SYSTEM AND METHOD FOR EXTENDING RANGE OF RADIO FREQUENCY IDENTIFICATION (RFID) SIGNAL COMMUNICATIONS

CROSS-REFERENCE TO RELATED APPLICATIONS

Not Applicable

STATEMENT REGARDING FEDERALLY SPONSORED RESEARCH OR DEVELOPMENT

Not Applicable

FIELD OF THE INVENTION

The present invention relates to wireless communication systems and methods and, more particularly to radio frequency identification (RFID) wireless communication systems and methods.

BACKGROUND OF THE INVENTION

Radio frequency identification (RFID) technology has become ubiquitous in a variety of environments, including among other things in industrial environments. Often such technology is implemented by way of RFID transponders (or tags) and RFID receivers (or readers). In at least some such embodiments, an RFID transponder is in wireless communication with a RFID receiver and, by virtue of such wireless communication, identification information can be communicated between the two devices. The communicated information can be, for example, identification information that is indicative of an identity (or characteristic) of the RFID transponder or another device with which the RFID transponder is associated. The information that is stored on and provided by the RFID transponder can be, for example, several bits of data that identifies the RFID transponder or an object with which the RFID transponder is associated.

Even though RFID technology has become ubiquitous, there are many circumstances, environments, and applications where such technology cannot function sufficiently well or cannot function at all. In particular, for some conventional RFID technology to operate properly, the RFID transponder and RFID receiver typically need to be in relatively close proximity with one another. This can particularly be the case in embodiments in which the RFID transponder is a passive device with a microchip (and/or other components) that is powered largely or exclusively only by the electromagnetic signal sent out by the RFID receiver (reader) when the RFID receiver is making an inquiry to the transponder. Also in at least some cases, the maximum distance between the transponder and receiver that is acceptable often depends upon frequency. For example, where a low frequency (LF) signal is employed (for example, 125 kHz or 125-135 kHz), the RFID transponder and RFID receiver can need to be within about three (3) centimeters or less (e.g., 1 to 3 centimeters, or about 2 centimeters) of one another for successful communications occur. Further, while in some other frequency ranges a greater distance can be acceptable (e.g., for Ultra-High Frequency or UHF signals at, for example, 900 MHz, a range of up to 30 meters can be acceptable), in such other frequency ranges other constraints preclude effective RFID operation (e.g., in UHF it is difficult to transmit through metals and liquids). Additionally in some circumstances, for conventional RFID technology to operate properly, the line-of-sight between the RFID transponder and RFID receiver (or the tank circuits thereof) should generally be unobstructed.

Notwithstanding the desirability of meeting these conditions, there are many circumstances, environments, and applications in which one or more of these conditions are difficult or impossible to satisfy. In particular, it can be difficult to achieve close proximity between RFID transponders and RFID receivers in industrial environments where equipment on which a given RFID transponder is located is physically positioned distant from the location of a RFID receiver, or vice-versa. Also, it can be difficult to orient a given RFID transponder and a given RFID receiver so that there is an unobstructed line-of-sight between the two, for example, because the RFID transponder is around a corner relative to the location of a complementary RFID receiver.

For at least these reasons, therefore, it would be advantageous if an improved RFID system and/or method could be developed that allowed for or facilitated desired wireless communications between RFID transponders and RFID receivers notwithstanding circumstances, environments, and/or applications in which such devices cannot be adequately close to one another, and/or in which such devices cannot be positioned apart from one another along an unobstructed line-of-sight, and/or in which one or more other improvements can be achieved.

BRIEF SUMMARY OF THE INVENTION

In at least some embodiments, a system for facilitating wireless communications between a radio frequency identification (RFID) reader device and a RFID transponder device includes an extender circuit. The extender circuit includes a first tank circuit including a first inductor connected in parallel with a first capacitor between first and second nodes, and a second tank circuit including a second inductor connected in parallel with a second capacitor between third and fourth nodes. The extender circuit also includes a first connection including a resistor, the first connection linking the first and third nodes, and a second connection between the second and fourth nodes, wherein the second and fourth nodes are at or substantially at a common voltage.

Further, in at least some embodiments, a sensing system includes a radio frequency identification (RFID) reader or transponder device mounted on a first portion of the sensing system, the RFID reader including a first antenna device. The sensing system also includes a RFID extender circuit mounted on a second portion of the sensing system, the RFID extender circuit including second and third antenna devices coupled at least indirectly by way of a first connecting structure including a resistor. The second antenna device is capable of communicating with the first antenna device and the third antenna device is configured to communicate with an external device, whereby the RFID reader or transponder device is able to detect a presence of the external device in proximity to the third antenna device by virtue of wireless communications between first and second antenna devices.

Additionally, in at least some embodiments, a method of facilitating wireless communications between a radio frequency identification (RFID) reader device and a RFID transponder device includes receiving a first wireless communication signal from the RFID transponder device at a first tank circuit of a RFID extender circuit. The method further includes communicating an electrical signal based upon the received first wireless communication signal from the first tank circuit to a second tank circuit of the RFID extender circuit, the second tank circuit being electrically coupled to the first tank circuit at least by way of a resistor. The method also includes sending a second wireless communication signal from the second tank circuit for receipt by the RFID reader device.

DETAILED DESCRIPTION OF THE PREFERRED EMBODIMENT

Figure 1:
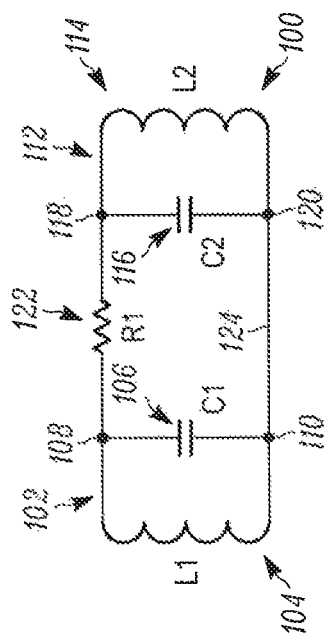
FIG. 1 is a schematic diagram showing an exemplary passive radio frequency identification (RFID) extender circuit.

Referring to FIG. 1, a schematic diagram is provided showing an exemplary passive radio frequency identification (RFID) extender circuit 100. As shown, in the present embodiment, the passive RFID extender circuit 100 includes a first antenna device 102 that in the present embodiment is a first tank circuit having a first inductor 104 (having inductance L1) and a first capacitor 106 (having capacitance C1) connected in parallel between a first node 108 and a second node 110, as well as a second antenna device 112 that in the present embodiment is a second tank circuit having a second inductor 114 (having inductance L2) and a second capacitor 116 (having capacitance C2) connected in parallel between a third node 118 and a fourth node 120. Further, the passive RFID extender circuit 100 also includes a resistor 122 (having resistance R1) linking the first node 108 and the third node 118, as well as a connector 124 linking the second node 110 and the fourth node 120. The connector 124 can be understood to be simply a wire or other linkage that provides a short-circuit path between the second and fourth nodes 110, 120, such that those nodes 110, 120 are at the same voltage and in fact can be considered (along with the connector 124) as a single overall node.

The particular values of the respective inductances L1 and L2 of the inductors 104 and 114, respectively, the respective capacitances C1 and C2 of the capacitors 106, 116, respectively, and the resistance R1 of the resistor 122 can vary depending upon the embodiment and various considerations including, for example, the intended frequency of operation. In one exemplary embodiment of the RFID extender circuit 100 that is intended for operation at 125 Hz, each of the inductances L1 and L2 of each of the inductors 104 and 114 is 1 milliHenry (mH), each of the capacitances C1 and C2 of each of the capacitors 106 and 116 is 1500 picoFarads (pF), and the resistance R1 of the resistor is 100 ohms. Again, however, these values will depend upon the embodiment. Also, with respect to the connector 124, in alternate embodiments, it is possible that the connector 124 has a non-negligible resistance that is still considerably smaller than the resistance R1 of the resistor 122 (in such case, the connector 124 provides a substantially short-circuit path between the nodes 110 and 120). As shown, the passive RFID extender circuit 100 is passive in that it has no active components such as batteries or the like that provide power to the circuit.

Figure 2:
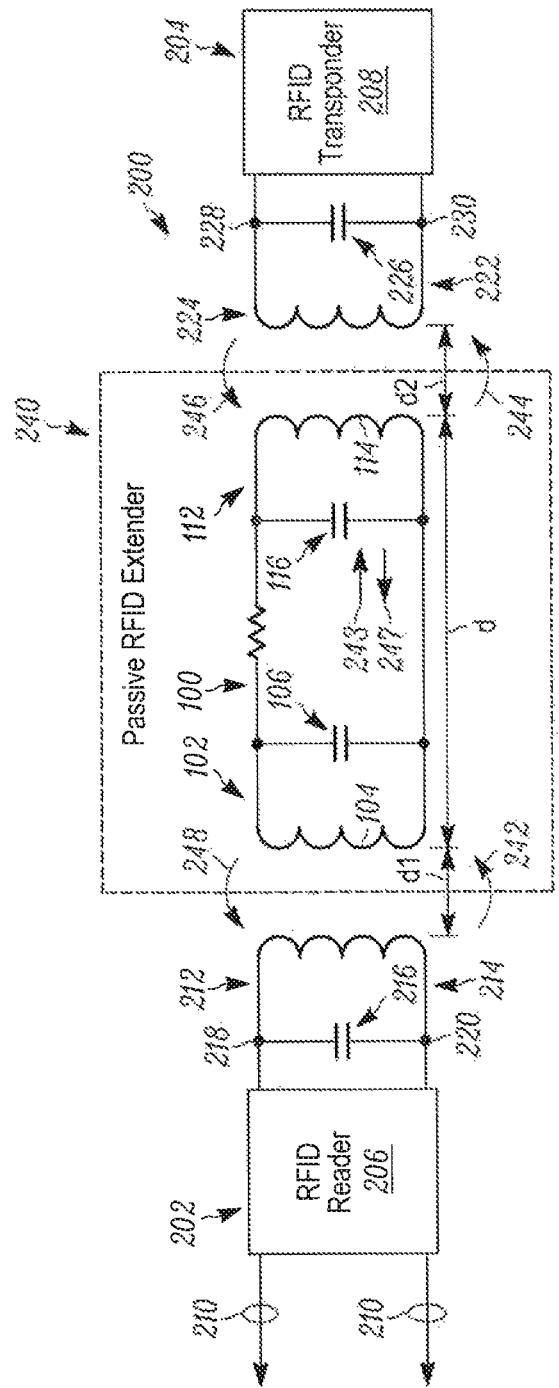
FIG. 2 is a further schematic diagram showing a system including the exemplary passive RFID extender circuit of FIG. 1 implemented in combination with an RFID reader (receiver) device and an RFID transponder device, the RFID extender circuit facilitating communications between the RFID reader and transponder devices.

Turning to FIG. 2, the passive RFID extender circuit 100 is shown to be incorporated into a system 200 that additionally includes a RFID reader (or receiver) device 202 and a RFID transponder device 204. The RFID reader device 202 and RFID transponder device 204 are of conventional design. More particularly, the RFID reader device 202 includes a RFID reader component 206 and the RFID transponder device 204 includes a RFID transponder component 208. Additionally, each of the RFID reader device 202 and the RFID transponder device 204 includes a respective antenna device that in the present embodiment is a respective tank circuit, that is, the RFID reader device 202 includes the RFID reader component 206 coupled in combination with a third antenna device 212 that is a third tank circuit and the RFID transponder device includes the RFID transponder component 208 coupled in combination with a fourth antenna device 222 that is a fourth tank circuit. As shown, the third antenna device 212 particularly includes a third inductor 214 connected in parallel with a third capacitor 216 between a fifth node 218 and a sixth node 220, which are in turn are in communication with the third RFID reader component 206. Further as shown, the fourth antenna device 222 particularly includes a fourth inductor 224 connected in parallel with a fourth capacitor 226 between a seventh node 228 and an eighth node 230, which are in turn are in communication with the RFID transponder component 208.

Given that the RFID reader device 202 and RFID transponder device 204 are of conventional design, it will be understood that those devices are capable of wirelessly communicating with one another so long as the two devices (and particularly their respective antenna devices, that is, the third and fourth antenna devices 212, 222) are sufficiently close to one another and a line-of-sight between the two devices is unobstructed. Commonly, the RFID reader device 202 detects a wireless signal from the RFID transponder device 204 that is indicative of the presence of, and/or various identification information or other information of interest regarding, the RFID transponder device or another device with which the RFID transponder device is associated (e.g., a product being manufactured on an assembly line that has been tagged with the RFID transponder device). As discussed in further detail below, the RFID transponder device 204 can be an active device (with its own power supply) or alternatively merely a passive device. In at least some embodiments, and particularly in at least some embodiments when the RFID transponder device 204 is a passive device, a signal is communicated from the RFID transponder device for receipt by the RFID reader device 202 only after or in response to the sending of a signal by the RFID reader device that is received by the RFID transponder device (in at least some such cases, operation of the RFID transponder device is powered by that signal received from the RFID reader device). In at least some embodiments or cases, and as illustrated in FIG. 2, the RFID reader device 202 (and particularly the RFID reader circuit 206) has one or more output ports by which the RFID reader device can send signals 210 indicative of information detected by the RFID reader device based upon its communications with the RFID transponder device 204. Although not shown, in other embodiments the RFID reader device 202 also can have input port(s) by which input signals or commands are received from other device(s). The signals 210 and data contained therein can be provided to any of a variety of other devices or systems, by way of any of a variety of wired or wireless communication links or networks or other communication devices or systems.

Figure 7:
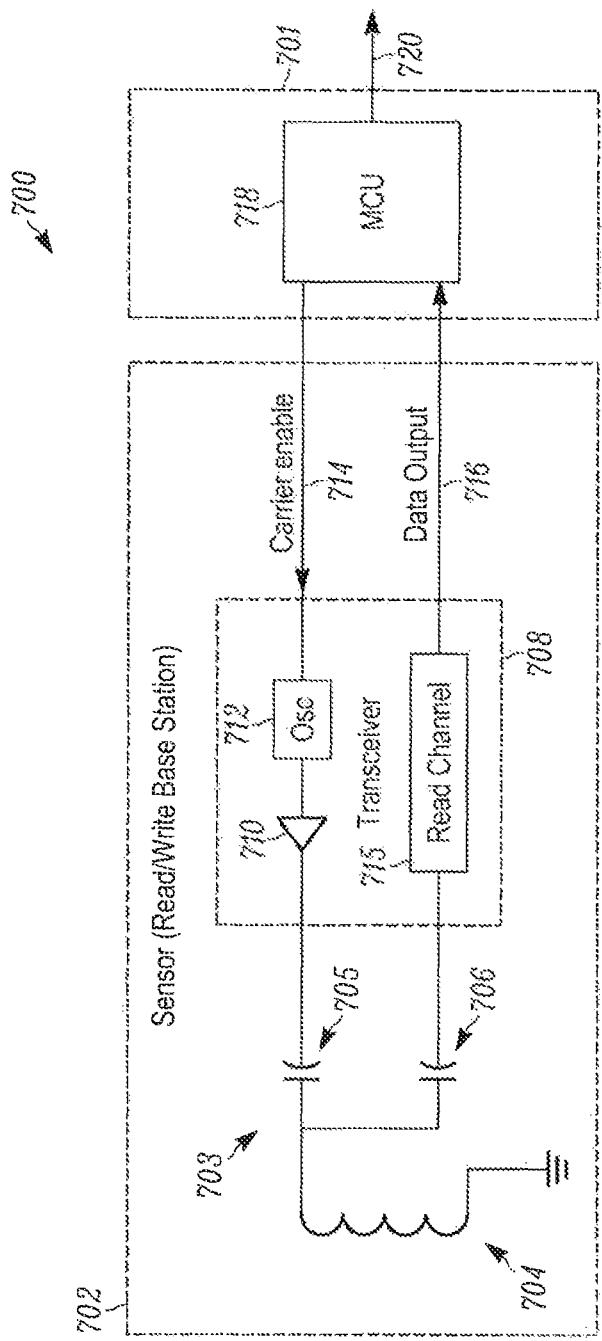
FIG. 7 is a schematic diagram showing another exemplary embodiment of a RFID reader device differing somewhat from that of FIG. 2.

It should be understood that each of the RFID reader device 202 and the RFID transponder (tag) device 204 take a variety of different forms other than those particularly shown in FIG. 2, depending upon the embodiment. For example, referring to FIG. 7, a modified version of the RFID reader device, shown as a RFID reader device 700, includes a processing station 701 as well as a base station or sensor portion 702. As shown, the processing station 701 includes a microcomputer unit (MCU) 701, while the sensor portion 702 includes an antenna portion 703 and a transceiver circuit 708. The antenna portion 703 particularly includes an inductor 704 coupled between ground and first and second capacitors 705 and 706, respectively, which are coupled in parallel between the inductor and the transceiver circuit 708. The transceiver circuit 708 includes an amplifier portion 710 and an oscillator portion coupled in series with one another between the first capacitor 705 (particularly the terminal of the capacitor other than the terminal coupled to the inductor 704) and a link 714 with the MCU unit 718. The link 714 particularly is designed to communicate carrier enable signals from the MCU unit 718 to the oscillator portion 712, which in turn communicates signal(s) to the amplifier portion 710, which in turn provides signal(s) to the first capacitor 705 of the antenna portion 703. Further as shown, the transceiver circuit 708 also includes a read channel 715 coupled between the second capacitor 706 (particularly the terminal of the capacitor other than the terminal coupled to the inductor 704) and a link 716 by which the read channel is coupled also to the Mai 718. The link 716 particularly is designed to communicate data output signals from the read channel 715 to the MCU unit 718. The MCU unit 718, finally, controls the provision of the carrier enable signals and also processes the information received via the data output signals. Based at least upon the data output signals, the MCU 718 further is able to provide output signals 720 similar to or corresponding to the signals 210 of FIG. 2. Again, this additional embodiment of RFID reader device shown in FIG. 7 is only one of a variety of other possible embodiments for the RFID reader device, and numerous other embodiments of both the RFID reader device and RFID transponder device are intended to be encompassed herein. Further for example, in other embodiments, the RFID transponder device can be a chipless RFID transponder device that does not include any microchip.

Notwithstanding the conventional capabilities of the RFID reader device 202 and the RFID transponder device 204, as already discussed above, in a variety of circumstances, environments, and applications, the RFID reader device 202 and RFID transponder device 204 cannot be sufficiently close to one another and/or a line-of-sight between the two devices is obstructed in some manner. That being the case, in many (if not all) such circumstances, environments, and applications, the passive RFID extender circuit 100 can be utilized to facilitate communications between the RFID reader device 202 and the RFID transponder device 204 even despite the lack of proximity between those devices and/or despite a possible obstruction between those devices. FIG. 2 particularly illustrates in schematic form an arrangement where the RFID reader device 202 and the RFID transponder device 204 operate as part of the system 200, where the system encompasses not only those devices but also the passive RFID extender circuit 100 as well. As illustrated by a dashed box 240, in at least some circumstances (but not all circumstances) the passive RFID extender circuit 100 can be housed within, or otherwise supported or positioned in relation to, an associated structure such as a housing.

When appropriately implemented, the passive RFID extender circuit 100 enables the RFID reader device 202 to engage in wireless communications with the transponder device 204 that is the same as (or substantially the same as) if those devices were in normal, direct communications with one another assuming those devices were positioned sufficiently close to one another without any obstruction between one another, even though in fact the RFID transponder and reader devices are not in proximity with one another and/or are separated by an obstruction placed along the line-of-sight path between those two devices. More particularly, the RFID reader device 202 engages in communications with the passive RFID extender circuit 100 by virtue of wireless communications between the third antenna device 212 and the first antenna device 102 (or particularly the inductors 214, 104 thereof), and the RFID transponder device 204 engages in communications with the passive RFID extender circuit 100 by virtue of wireless communications between the fourth antenna device 222 and the second antenna device 112 (or particularly the inductors 224, 114 thereof). For proper operation, in at least some embodiments, the inductance and capacitance values of the first inductor 104 and first capacitor 106 of the first antenna device 102 are chosen to complement the inductance and capacitance values of the third inductor 214 and third capacitor 216 of the third antenna device 212, such that the first and third antenna devices are resonant in relation to one another. Likewise, for proper operation, in at least some embodiments, the inductance and capacitance values of the second inductor 114 and second capacitor 116 of the second antenna device 112 are chosen to complement the inductance and capacitance values of the fourth inductor 224 and fourth capacitor 226 of the fourth antenna device 222, such that the second and fourth antenna devices are resonant in relation to one another. In at least some embodiments, all four of the antenna devices 102, 112, 212, and 222 are configured to be resonant at the same frequency.

With such wireless communications occurring, the RFID reader device 202 and RFID transponder device 204 are able to engage in communications with one another indirectly via the passive RFID extender circuit 100, which effectively serves to relay signals received at either one of the antenna devices 102, 112 to the other one of the antenna devices 112, 102. For example, as illustrated by arrows in FIG. 2, upon the RFID reader device 202 sending wirelessly an inquiry signal (represented by an arrow 242) to the passive RFID extender circuit 100, an electrical signal (represented by an arrow 243) based upon that inquiry signal is then communicated within the passive RFID extender circuit 100 from the antenna device 102 to the antenna device 112, and then a relayed inquiry signal (represented by an arrow 244) based upon that electrical signal is then transmitted from that circuit to the RFID transponder device 204. Subsequently, further in response to receiving the relayed inquiry signal, the RFID transponder device 204 sends a response signal (represented by an arrow 246) back to the passive RFID extender circuit 100 and, as a result, a further electrical signal (represented by an arrow 247) based upon that response signal is then communicated within the passive RFID extender circuit 100 from the antenna device 112 to the antenna device 102, and then additionally in response a relayed response signal (represented by an arrow 248) based upon the further electrical signal is sent back to the RFID reader device 202.

The response signal (represented by the arrow 246) in at least some embodiments can particularly be a modulated signal including identification data or other characteristic information stored on the RFID transponder device 204 (particularly on the RFID transponder component 208, which can be a microchip), and the RFID reader device 202 can upon receiving the relayed response signal (represented by the arrow 248) process that signal, including possibly the conversion of the data contained in that signal into digital form. The amount of data transmitted can be, for example, 128 bits of information or more (e.g., up to 360 bits of information or even more). In at least some embodiments, not only is the RIM extender circuit 100 a passive device but also the RFID transponder (or tag) 204 device is a passive device. More particularly, in at least some embodiments, the RFID transponder component 208 is or includes a microchip that is solely power based upon the signal received from the RFID reader device 202 as relayed by the RFID extender circuit 100 (e.g., based upon the relayed inquiry signal represented by the arrow 244). In other embodiments, however, the RFID transponder device 204 can be an active (e.g., battery-powered) device. Depending upon the embodiment, the RFID transponder component 208 (or any microprocessor or other microchip thereof) can be read only device or a read/write device.

As noted above, such communications between the RFID reader device 202 and RFID transponder device 204 indirectly by way of the functioning of the passive RFID extender circuit 100 only can occur if the three components (the devices 202 and 204 and the circuit 100) are appropriately implemented. More particularly in this regard, the first and third antenna devices 102 and 212, respectively, should be sufficiently close in proximity with one another and also a line-of-sight (direct linear) path between those antenna devices should be entirely (or at least substantially) unobstructed. Likewise, the second and fourth antenna devices 112 and 222, respectively, should be sufficiently close in proximity with one another and also a line-of-sight path between those antenna devices should be entirely (or at least substantially) unobstructed. That is, both the first and third antenna devices 102, 212 should be arranged in relation to one another, and also the second and fourth antenna devices 112, 222 should be arranged in relation to one another, in the same or substantially the same manner as would be appropriate for arranging the third and fourth antenna devices (antenna devices 212, 222) relative to one another so as to allow for direct wireless communications between the RFID reader device 202 and the RFID transponder device 204.

For example, in at least one embodiment, the first and third antenna devices 102, 212 (and particularly the inductors thereof, e.g., the inductors 104 and 214) should be in relatively close proximity with on another, and likewise the second and fourth antenna devices 112 and 222 (and particularly the inductors thereof e.g., the inductors 114 and 224) should be in relatively close proximity with on another. The maximum acceptable distance between the pairs of communicating antenna devices (or inductors) can depend upon various factors, including the frequency at which the wireless signals are being communicated. Further for example, for at least some low frequency (LF) signals (e.g., signals at 125 kHz) a maximum acceptable distance d1 between the antenna devices 102, 212 (or inductors 104, 214 thereof) as shown in FIG. 2 can be between one (1) and three (3) centimeters (or about two (2) centimeters or not much more than that distance) with no obstruction in between, and likewise a maximum acceptable distance d2 between the second and fourth antenna devices 112, 222 (or inductors 114, 224) thereof) as shown in FIG. 2 can also be between one (1) and three (3) centimeters (or about two (2) centimeters or not much more than that distance) with no obstruction in between. In other embodiments, these maximum acceptable distances (e.g., d1 and d2) can be other amounts, and also in some embodiments the maximum acceptable distance d1 between the first and third antenna devices 102, 212 can differ from the maximum acceptable distance d2 between the second and fourth antenna devices 112, 222.

Assuming such proper implementation in terms of the positioning of the first and third antenna devices 102, 212 relative to one another and also the positioning of the second and fourth antenna devices 112, 222 relative to one another, the RFID reader device 202 and RFID transponder device 204 themselves can be relatively far apart and positioned with one or more obstructions therebetween given the presence of the passive RFID extender circuit 100, as would not otherwise be possible absent the extender circuit. More particularly, it should be understood that notwithstanding the schematic representations provided in FIGS. 1 and 2, the passive RFID extender circuit 100 can physically take a variety of forms, dimensions, and shapes that can accommodate a variety of arrangements of the RFID reader device 202 and RFID transponder.

For example, the passive RIM extender circuit 100 can in some exemplary embodiments have a length (e.g., a distance d between the respective first and second inductors 104, 114 of the respective first and second antenna devices 102, 112 as shown in FIG. 2) as accommodated by the resistor 122 and the connector 124 that is considerably greater than the acceptable distances between the first antenna device 102 and the third antenna device 212 or between the second antenna device 112 and the fourth antenna device 222. For example, in some embodiments the passive RFID extender circuit 100 can have a length of up to five (5), fifty (50), or more centimeters even though the distances between the wirelessly-communicating antenna devices (that is, the distance between the antenna devices 102 and 212 as well as the distance between the antenna devices 112 and 222) cannot exceed about two (2) centimeters in such embodiments. Further for example, the passive RFID extender circuit 100 can have a variable length where the distance d shown in FIG. 2 can vary depending upon the circumstance. Such variable length capability can be achieved in any of a variety of manners. For example, in some embodiments, the resistor 122 and connector 124 (or portions thereof, e.g., wire extensions extending from either sides of the electrically-resistive portions of the resistor 122) can include undulating features such that the resistor 122 and connector 124 can be stretched in length or compressed in length. Also for example, in some embodiments the resistor 122 and connector 124 (or portions thereof) can be made of materials that can be stretched or compressed.

Figure 6:
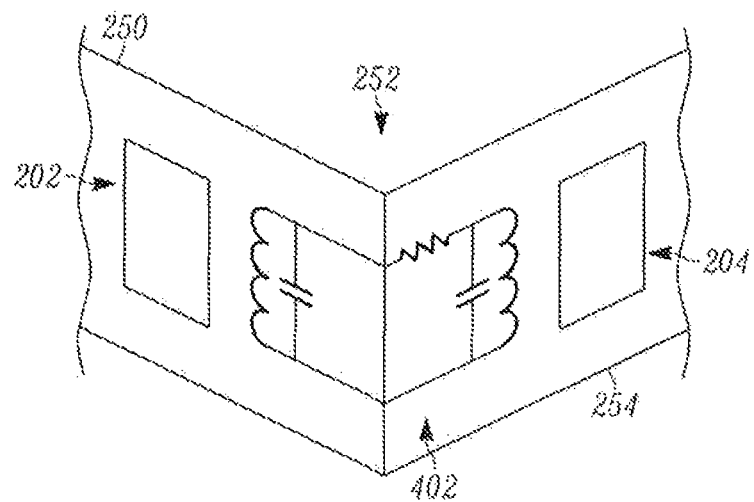
FIG. 6 is another schematic diagram showing a modified version of the system of FIG. 2 implemented in relation to a corner structure.

Additionally for example, in some embodiments, the passive RFID extender circuit 100 can take nonlinear forms, that is, the circuit need not follow a physically-linear path between the first and second antenna devices 102, 112 (and particularly between the first and second inductors 104, 114 of those respective antenna devices) at its ends (e.g., along the distance d). Rather, in at least some embodiments the passive RFID extender circuit 100 can have a bent or angled configuration such that two linear (or substantially-linear) legs of that circuit, which are connected to one another somewhere along its midregion (e.g., somewhere along the resistor 122 and the connector 124) and extend outward to the first and second antenna devices 102, 112, are angled relative to one another. Depending upon the embodiment, the two legs of the passive RFID extender circuit 100 can be at acute, obtuse, or right angles relative to one another. Such a configuration can be particularly advantageous so as to allow the passive RFID extender circuit 100 to extend around an obstruction that otherwise would block a line-of-sight (direct linear) path between the RFID reader device 202 and RFID transponder device 204. For example, as shown in FIG. 6, such a configuration can be advantageously employed in circumstances where the RFID reader device 202 is on a first side 250 of a corner 252 and the RFID transponder device 204 is on a second side 254 of the corner, and a modified bent or angled version of the passive RFID extender circuit 100 shown as a passive RFID extender circuit 402 extends (so as to wrap) around the corner. Also for example, in some embodiments in which the passive RFID extender circuit 100 takes nonlinear forms, that circuit can have more complicated shapes involving multiple bends or curves (e.g., an undulating shape) so as to allow the circuit to conform to more complicated shapes of surrounding structure(s) or to otherwise pass around or by multiple structures or obstructions.

Further for example, in some embodiments the passive RFID extender circuit 100 can be variable in shape. In this regard, the passive RFID extender circuit 100 (and particularly again the resistor 122 and the connector 124 or portions thereof) can be made of materials or otherwise have characteristics that are suitable for allowing the overall circuit to be modified from a straight shape to a bent, curved, or other shape, and/or modified to a straight shape from a bent, curved, or other shape, or modified from any of such shapes to yet other bent, curved, or other shapes. Also for example, in at least some embodiments, the passive RFID extender circuit 100 can be modifiable both in terms of its length and in terms of its shape.

Figure 3:
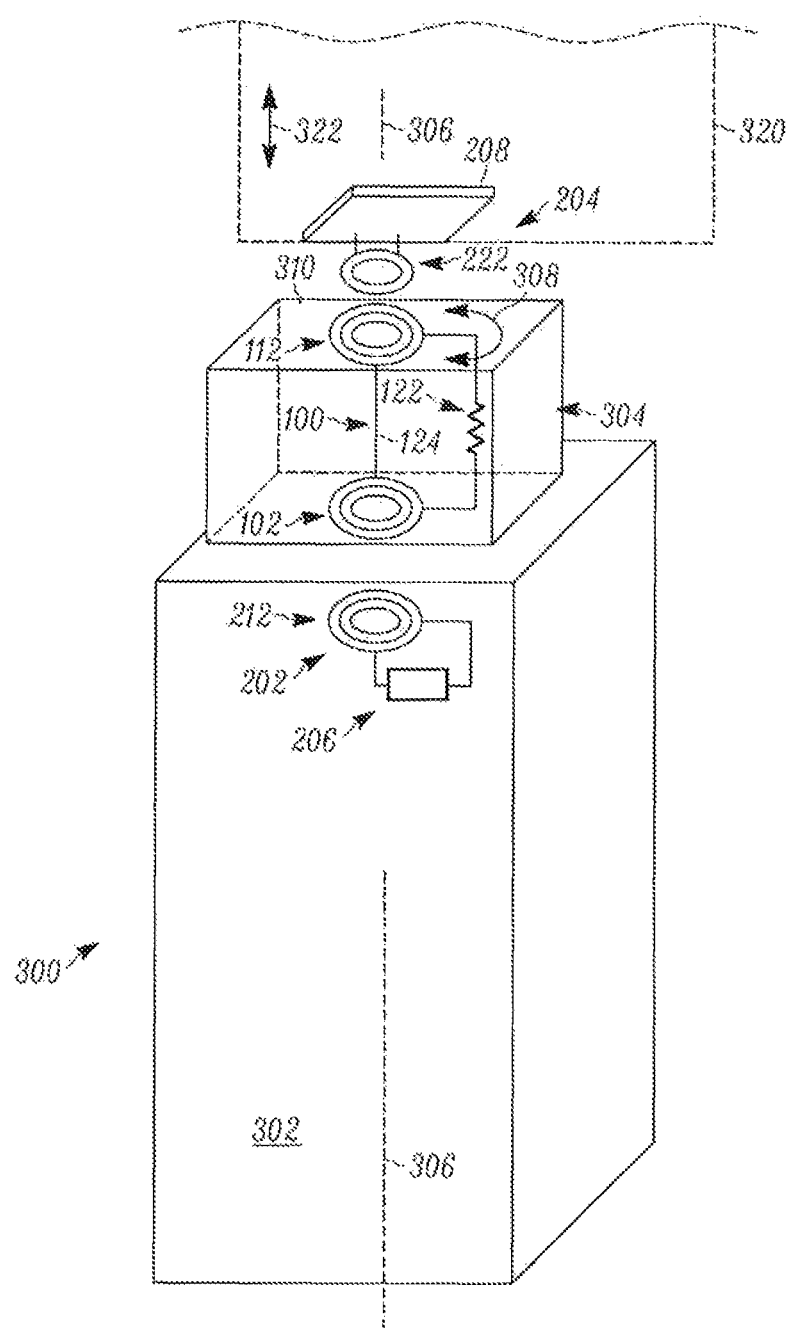
FIG. 3 is an additional schematic diagram of an exemplary implementation of the RFID extender circuit and RFID reader device of FIG. 2 shown implemented in an exemplary sensing system in relation to the RFID transponder device of FIG. 2.
Figure 4:
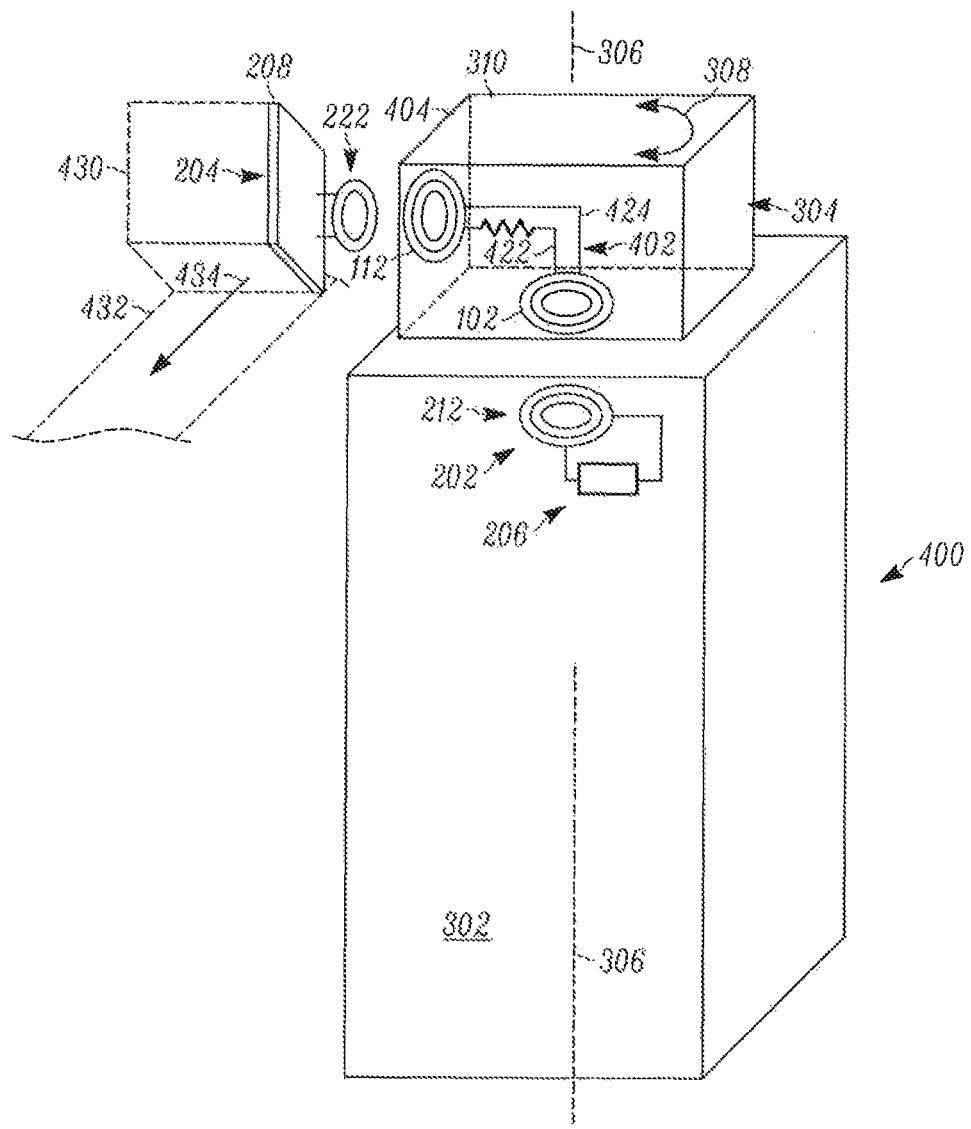
FIG. 4 is a further schematic diagram of an exemplary sensing system with a modified version of the RFID extender circuit and the RFID reader device, again in relation to the RFID transponder device of FIG. 2.
Figure 5:
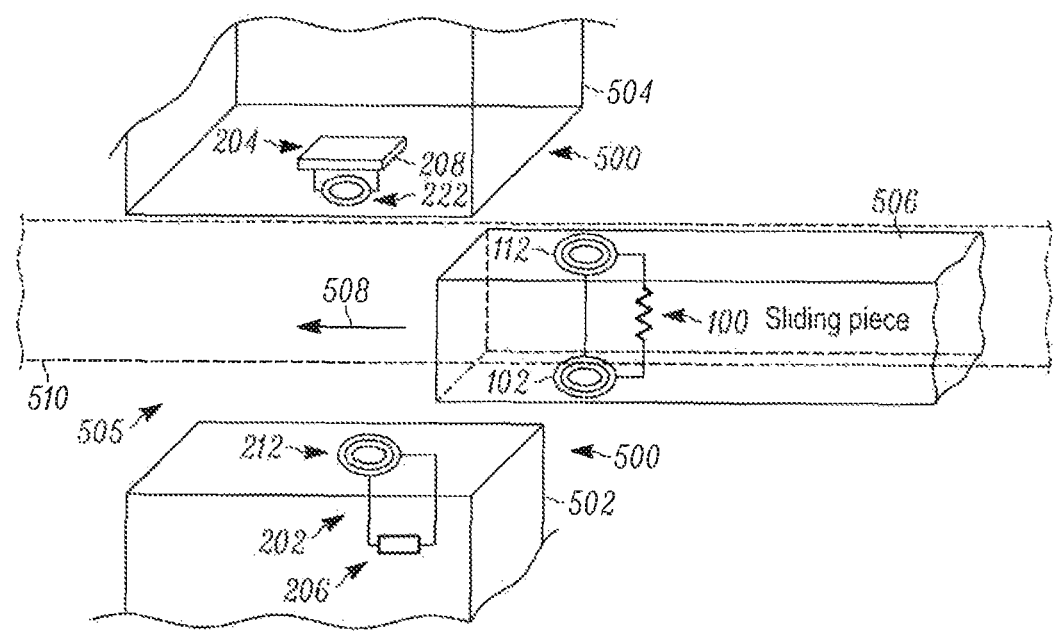
FIG. 5 is another schematic diagram of another exemplary implementation or the RFID extender circuit, RFID reader device, and RFID transponder device of FIG. 2, in which the reader and transponder devices are in a sensing system and the RFID extender circuit is mounted within a sliding component.

Given the various capabilities and configurations of the passive RFID extender circuit 100 depending upon its embodiment, the passive RFID extender circuit (or variations thereof) can be employed in a variety of circumstances, environments, and applications as part of the system 200 (or variations thereof) so as to allow for or facilitate communications between the RFID reader device 202 and the MD transponder device 204. Referring now to FIGS. 3-5, several such exemplary applications are shown in schematic form. FIGS. 3 and 4 particularly show first and second sensing systems 300 and 400, respectively, in which the RFID reader device 202 with the RFID reader component 206 and third antenna device 212 (shown schematically in a different manner by way of coil rings rather than by way of inductor and capacitor symbols) operates as a sensor and is mounted on a base 302 serving as a support for the sensor. Also, each of the sensing systems 300, 400 includes the passive RFID circuit 100 (or a variation thereof in the case of the system 400 of FIG. 4) mounted within a rotating head structure 304 atop the base 302. In the present embodiment, the rotating head structure 304 is continuously rotatable about the base 302 and capable of rotating more than 360 degrees. In alternate embodiments, however, the rotating head structure 304 can also be rotatable only to discrete rotational positions relative to the base 302 (e.g., rotational positions separated from one another by 90 degree or 180 degree increments) and/or be rotatable within ranges of less than 360 degrees (e.g., only within a 180 degree range). Thus, the rotating head structure is intended to be representative of a wide variety of different structures that are fully or partly rotatable.

The RFID transponder device 204 with the RFID transponder component 208 and the fourth antenna device 222 (also shown schematically in this case by way of coil rings rather than by way of inductor and capacitor symbols) for simplicity of explanation is not considered part of the sensing system 300 but rather is considered to be (or to be a part of) a sensed device (albeit the transponder device can alternatively be considered part of the overall sensing system), FIGS. 3 and 4 show the RFID transponder device 204 to be positioned at different locations in relation to the sensing systems 300, 400. More particularly, and as discussed further below, FIG. 3 shows the RFID transponder device 204 to be positioned directly vertically above the entire sensing system 300, but FIG. 4 shows the RFID transponder device to be positioned vertically above but also to the side of the sensing system 400, and particularly along one of the sides of the rotating head structure 304.

Referring now more particularly to FIG. 3, the sensing system 300 includes the passive RFID extender circuit 100 mounted within the rotating head structure 304, which is rotatably supported upon the base 302. That is, the rotating head structure 304 and the passive RFID extender circuit 100 are capable of rotating (in this example) in either direction about a vertical axis 306, as represented by a curved double-headed arrow 308, relative to the base 302. In this embodiment, the passive RFID extender 100 is the circuit shown in and discussed above with respect to FIGS. 1-2, and again is shown to include the first and second antenna devices 102 and 112 respectively connected by the resistor 122 and connector 124 (albeit, as with the RFID reader device and RFID transponder device shown in FIG. 3, the antenna devices are again represented by coils than by way of inductor and capacitor symbols). Further in this embodiment, the passive MD extender circuit 100 has a linear configuration in which both the resistor 122 and the connector 124 extend vertically parallel to the vertical axis 306 between the first antenna device 102 and the second antenna device 112 located above and below the resistor and connector at opposite ends of the passive RFID extender circuit such that the first antenna device is located proximate the base 302 and the second antenna device is located proximate a top side 310 of the rotating head structure 304.

Given this configuration, the first antenna device 102 is capable of communicating with the third antenna device 212 of the RFID reader device 202 and the second antenna device 112 is capable of communicating with the fourth antenna device 222 assuming that the RFID transponder device 204 is positioned as shown in FIG. 3, that is, directly vertically above and sufficiently proximate to the top side 310 of the rotating head structure 304 (with no obstruction in between). Thus, in this implementation, the RFID reader device 202 is capable of communicating with and thereby detecting the presence of the RFID transponder device 204 by way of the passive RFID extender circuit 100 given the particular positioning of the RFID transponder device, it being understood that such communication would no longer be possible if the RFID transponder device 204 was moved sufficiently far away from the second antenna device 112 (either vertically or to the side).

As indicated by a comparison of FIGS. 3 and 4, the sensing system 400 of FIG. 4 is shown to have a similar but somewhat different form than the sensing system 300 of FIG. 3. As shown, the RFID transponder device 204 of FIG. 4 is positioned at a vertical level (along the vertical axis 306) approximately even with the vertical position of the rotating head structure 304. To allow for sensing of the RFID transponder device 204 with such a position alongside the rotating head structure 304, the sensing system 400 includes the modified version of the passive RFID extender circuit 100, that is, the passive RFID extender circuit 402 already discussed above with respect to FIG. 6. As shown in FIG. 4, the passive RID extender circuit 402 has a bent or right-angled configuration in which the second antenna device 112 is positioned along a side surface 404 of the rotating head structure (which in the illustration provided in FIG. 4 is along the left side of the rotating head structure as shown) even though the first antenna device 102 of the extender circuit is positioned along a bottom surface 405 of the rotating head structure proximate the base 302 and the third antenna device 212 of the RFID reader device 202. That is, the passive RFID extender circuit 402 has a resistor 422 and connector 424 linking the first antenna device 102 and second antenna device 112 that, while having the same (or substantially similar) electrical properties as the resistor 122 and connector 124 shown in FIGS. 1-3, are configured to have angular (potentially right-angle) bends to accommodate positioning of the first and second antenna devices respectively along the respective side and bottom surfaces 404, 405 of the rotating head structure.

With such an arrangement, the sensing system 400 is particularly suitable for allowing the RFID reader device 202 to detect the presence of the RED transponder device 204 at a variety of locations around the rotating head structure 304, so long as the transponder device is at a vertical level coinciding with (or substantially coinciding with) the vertical level of the rotating head structure and the second antenna device 112 (above and to the side of the base 302, at different rotational positions around the base). That is, because the rotating head structure 304 is capable of rotating about the vertical axis 306, the passive RFID extender circuit 402 with its angled configuration is also rotatable such that the second antenna device 112 can be positioned at any rotational orientation about the vertical axis. As such, with any given orientation of the rotating head structure 304, the RFID extender circuit 402 is specifically oriented to be in communication with the RFID transponder device 204 if the transponder device happens to be aligned (or substantially aligned) with the second antenna device 112 both vertically and in terms of its positioning around the vertical axis relative to how the second antenna device is rotationally positioned (and assuming no obstruction between the transponder device and the antenna device 112).

Thus, in the example illustration of FIG. 4, while the passive RFID extender circuit 402 is capable of allowing communications to occur between the RFID reader device 202 and the RFID transponder device 204 when the RFID transponder device is positioned as shown, to the left of the rotating head structure 304, so as to be in proximity with the second antenna device 112 that is also shown to be oriented along the left side of the sensing system 400 (because the rotating head structure has been rotated to that position), the RFID extender circuit 402 oriented as shown would not be capable of allowing communications to occur if the RFID transponder device was positioned along the right side of the sensing system or at other locations not in proximity with the second antenna device. In effect, therefore, the sensing system 400 due to its employing of the angled passive RFID extender circuit 402 is capable of detecting an RFID transponder device only when there is proper rotational positioning of that transponder device around the sensing system 400 relative to the rotational position of the rotating head structure 304.

Although not necessarily the case in all embodiments or implementations, in at least some embodiments or implementations the sensing system 400 of FIG. 4 can be employed not only to detect the presence or absence of a RFID transponder device such as the RFID transponder device 204, in terms of whether that transponder device is aligned with and sufficiently proximate to the second antenna device 112, but also to detect the rotational position of the RFID transponder device about the sensing system 400 (and about the vertical axis 306). In some such embodiments, the sensing system 400 not only includes the rotating head structure 304 but also both controls its rotational position and monitors (keeps track of) that rotational position. Such control and monitoring can be provided by way of a controller or processor (e.g., a microprocessor, not shown) that controls actuation of a motor (also not shown) that rotates the rotating head structure 304, plus a sensor that detects the rotational position of the rotating head structure. Alternatively, the control process of the motor itself can include feedback or otherwise be such that information regarding the rotational position of the rotating head structure can be derived from information regarding the actuation of the motor (for example, in some embodiments a stepper motor can be employed).

Given such ability of the sensing system 400 to keep track of the rotational position of the rotating head structure 304 (and the passive RFID extender circuit 402 therewithin) in terms of its rotation about the vertical axis 306, the rotational position of the rotating head structure can be coordinated with the additional information obtained by way of the operation of the passive RFID extender circuit 402 and the RFID reader device 202 regarding the sensing of the presence of RFID transponder device(s) such as the RFID transponder device 204. Thus, when it is known (or supposed) that one or more RFID transponder devices such as the RFID transponder device 204 are potentially positioned at one or more locations around (and vertically aligned with) the rotating head structure 304, the sensing system 400 can be operated to "scan" for the presence of such RFID transponder device(s) by causing rotation of the rotating head structure (e.g., a full 360-degree rotation, or some other lesser or greater amount of rotation). Upon determining the presence of one or more RFID transponder device(s) during such a scan, then not only the presence (and/or other characteristic) information regarding the transponder device(s) will be known based upon the signal(s) received by the RFID reader device 202, but also the location(s) of the RFID transponder device(s) will also be known.

The sensing systems 300, 400 can be particularly useful in industrial or manufacturing environments, albeit the systems can also be employed in other environments as well. In at least some such circumstances, the sensing systems can be employed as (or in) non-contact switches or interlock switches or similar or related applications. Further, in at least some such circumstances, the sensing systems can be employed as safety non-contact switches or safety interlock switches (or in other safety applications or similar or related applications) including for example, embodiments of the SensaGuard family of non-contact safety switches available from Rockwell Automation, Inc. of Milwaukee, Wis., which is the assignee of the present application. Additionally for example in this regard, the base 302 and rotating head structure 304 shown in FIGS. 3 and 4 can respectively be the base and head of any of a variety of safety interlock switches available from Rockwell Automation, Inc, of Milwaukee, Wis. having such base and head structures including, for example, Trojan T15, Trojan 5, Trojan 6, Elf, Cadet3, MT-GD2, 440G-MT, Sprite, or Ensign interlock switches (including tongue interlock switches, guard locking interlock switches, hinge or hinge operated interlock switches, noncontact interlock switches).

Further in this regard, FIG. 3 can particularly be viewed as illustrating implementation of the sensing system 300 in an industrial/manufacturing environment as a non-contact switch or interlock switch that detects proximity of the sensing system 300 itself in relation to another structure such as a door 320 (shown in phantom and in cutaway) on which the RFID transponder device 204 is mounted (or with respect to which the RFID transponder device is otherwise associated), where the door is slidable toward or away from the sensing system 300 along a direction represented by a double-headed arrow 322. Additionally, FIG. 4 can particularly be viewed as illustrating implementation of the sensing system 400 in such an industrial/manufacturing environment as a non-contact switch that detects proximity of a product 430 (shown in phantom) on which the RFID transponder device 204 is mounted (or which respect to which that device is otherwise associated), where the product is moving along an assembly line 432 (shown in phantom and in cutaway) along a direction represented by an arrow 434. However, these implementations/applications are only intended to be exemplary and many other implementations/applications of a sensing system such as the sensing systems 300 or 400 in combination with an RFID transponder device such as the device 204 are also intended to be encompassed herein. It should be noted also here that the use of the term "safety" or other related terms herein is not a representation that any of the embodiments described herein will make an industrial process safe or that other systems will produce unsafe operation. Safety in an industrial process depends on a wide variety of factors outside of the scope of the present invention including, for example: design of the safety system; installation and maintenance of the components of the safety system; the cooperation and training of individuals using the safety system; and consideration of the failure modes of the other components being utilized. Although the present invention is intended to be highly reliable, all physical systems are susceptible to failure and provision must be made for such failure.

Turning to FIG. 5, in an additional application, a sensing system 500 includes the RFID reader device 202 (again having the MD reader component 206 and the third antenna device 212), which is mounted in a base or lower portion 502 of the sensing system, along with the RFID transponder device 204 (again having the RFID transponder component 208 and the fourth antenna device 222), which is mounted in an upper portion 504 of the sensing system. A space 505 exists between the lower and upper portions 502, 504. The passive RFID extender device 100, by comparison, is mounted within a component 506 to be sensed that in the present embodiment is intended to move in a sliding motion as represented by an arrow 508 horizontally in between the lower and upper portions 502, 504 through the space 505. Sensing of the component 506 occurs particularly when, during the sliding of the component 506 through the space 505, the first and second antenna devices 102 and 112 respectively are aligned with, and in sufficient proximity with respect to, the third and fourth antenna devices 212 and 222, respectively (and assuming that there are no obstructions between the communicating antenna devices).

Thus, in contrast to the applications shown in FIGS. 3 and 4 in which the passive RFID extender circuits together with the RFID reader devices form the sensing systems while the RFID transponder devices constitute (or are associated with) the sensed objects, in the application of FIG. 5 it is the RFID transponder device 204 and the RFID reader device 202 that operate in conjunction with one another as the sensing system 500 while the passive RFID extender circuit 100 within the component 506 is the sensed object (that said, the RFID extender circuit can alternatively be viewed as part of the sensing system 500 as well). The component 506 can be understood to be any of a variety of devices, products, or structures in relation to which the passive RFID extender circuit 100 is mounted. Given this arrangement, the sensing system 500 is also not only capable of sensing the presence of the component 506 as it passes through the space 505 between the lower and upper portions 502, 504, but also can sense any number of additional components passing through the space assuming that such additional components also include appropriate passive RFID extender circuits. Thus, the sensing system 500 can again (as described above with reference to FIG. 4) be employed in an industrial/manufacturing environment in relation to an assembly line 510 (shown in phantom and in cutaway) along which the component 506 and other similar components or items are moved along the route corresponding to the arrow 508. In such operations or circumstances the use of the sensing system 500 allows for tracking of when and how many of items such as the component 506 pass by a certain physical location.

Embodiments suitable for LF operation can be advantageous in a variety of respects. In particular, the RFID extender circuit can make possible communications between the RFID transponder and receiver devices in a variety of directions and along complex (e.g., non-linear) paths. Also, the range between a RFID transponder device and a RFID receiver device can be extended by large amounts through the use of the passive RFID extender circuit. As already noted, for example, assuming that wireless communications between the antenna devices at such frequencies would involve a maximum acceptable distance of about two (centimeters), use of a passive RFID extender circuit such as those discussed above can increase the acceptable distance by about twenty times. For example, instead of a three centimeter distance, the RFID extender circuit can allow the overall distance between RFID receiver and transponder devices to be around 60 centimeters, since the extender circuit itself can have a length (e.g., the distance d of FIG. 2) of around 50 centimeters and then additionally there can be further distances (e.g., the distances d1 and d2 of FIG. 2) of around 2 or 3 centimeters between the extender circuit and each of the RFID transponder device and MD receiver device. In at last some embodiments, standard antenna devices (e.g., proximity coils) of the RFID transponder device and RFID receiver device can be utilized with the passive RFID extender circuit without any modification thereto. Also, for LF operation, there is not a great sensitivity to orientation, simple amplitude modulated signals can be employed, and in at least some cases signal transmission through non-metallic obstructions will be permitted. Further, such implementations can be inexpensive.

Nevertheless, although LF operation is described above, other embodiments encompassed herein can be operational in high frequency (HF) (e.g., 13.56 MHz), ultra high frequency (UHF) (e.g., 900 MHz or 868-930 MHz), and very high frequency (VHF) (e.g., 2.4 or 2.45 GHz and 5.8 Ghz) ranges, among others. Indeed, notwithstanding the above description, numerous variations of the above-disclosed embodiments and alternate embodiments are intended to be encompassed herein as well. For example, although the antenna devices discussed above (e.g., the antenna devices 102, 112, 212, 222) are described as being tank circuits, in other embodiments other variations of antenna devices can be employed. Also for example, in some embodiments, the antenna devices are inductors only, or only include one or more rounds or loops (e.g., five or one-thousand) of wire that are not coupled in parallel with discrete capacitor devices. Nevertheless, in at least some such embodiments, there can still be a capacitance associated in the inductor and/or round(s) and/or loop(s) such that, practically speaking, the antenna device is still a tank circuit. Also, the shapes, sizes, and form factors of inductors (or wire loops) or other antenna devices can depend upon the embodiment. At some higher frequencies (e.g., HF, UHF, VHF), a RFID antenna or electric antenna (for beaming) can be utilized even thought at some lower frequencies (e.g., LF or some HF operation) an inductive antenna (for flooding) can be employed.

Further as already noted, while the particular passive RFID extender circuits disclosed herein have a resistor and a connector linking the nodes of the antenna devices at the ends of the extender circuits, in other embodiments it is possible that other linking elements can be employed instead of or in addition to those components. For example, in some alternate embodiments, it is possible that a capacitor can be employed in place of (or even possibly in combination with, e.g., in series or parallel with) the resistor 122. Additionally for example, in some alternate embodiments, it is possible that a diode or some other passive component can be employed in place of the resistor 122. Indeed, depending upon the embodiment, the element 122 shown in FIG. 1 can be any one or more of a resistor, a capacitor, a diode, or some other passive component, alone or in combination with one another. Also, while the RFID extender circuits disclosed herein are passive and do not have any active (e.g., power generating) components, in other embodiments it is possible that one or more active components can be added to the extender circuits. Additionally, while exemplary distances between the antenna devices have been described above (e.g., the distances d1 and d2 shown in FIG. 2), the appropriate or maximum acceptable distances between such antenna devices can vary based upon a variety of factors and embodiments and particularly can vary, for example, depending upon the form factors and other features of antenna device configuration. The appropriate or maximum acceptable distances between such antenna devices, as well as features of the antenna devices themselves, can also vary depending upon the intended frequency of operation.

Additionally, while the embodiments such as those discussed above can be employed in industrial or manufacturing environments, applications, and circumstances, it is envisioned that circuits, devices, systems, and methods/techniques as described above can be utilized also in a variety of other environments, applications, and circumstances as well, including for example in healthcare, transportation/shipping, retail, and other environments, applications, and circumstances. For example, one or more of the RFID devices described herein (e.g., the RFID transponder device) can be employed in labels, laminates, tickets, cards and related items (including for example credit cards, financial cards, banknotes, contactless smart cards, etc.), glass beads, wristbands, pendants, nails, boxes of electronics, buttons, etc., and can be hut need not be integrated with any other structure or device with which the RFID device is associated. Additional applications can be in monitoring/checking/sensing livestock (e.g., cows), gas cylinders, beer barrels, laundry/cleaning applications, library applications, conveyances, vehicles, disposal as well as non-disposable items, applications involving heavy logistics (e.g., brewers), farming applications, item-level tagging, error prevention applications, secure access applications, automotive and nonautomotive keys, airline (baggage) applications, toys, passports, entertainment applications, automation applications, anti-counterfeiting operations, and a variety of other applications and operations.

Also, notwithstanding the particular description of exemplary sensing systems and arrangements of sensing system components described above, the present invention is intended to encompass many other sensing systems and sensing system arrangements and components that have features differing from or in addition to those above. For example, even though the sensing system of FIG. 4 shows how the rotating head structure rotates about a vertical axis so as to allow for sensing of transponder devices at any location within a given horizontal plane at a particular vertical level, in alternate embodiments the rotation of the rotating head structure could be about another axis (e.g., a horizontal axis) and allow for sensing of transponder devices in other positions.

Further, notwithstanding the use of the term RFID with respect to the above embodiments, it should be understood that the present invention is not limited specifically to technologies commonly referred to as "RFID" technology. That is, the present invention is intended to encompass a variety of circuits, components, systems, devices, and methods/processes that, while not necessarily considered RFID technology, nevertheless employ an extender circuit having the same or substantially similar circuit components as described above in relation to the passive RFID extender circuits 100, 402 and that serve as an electronic bridge between two other wireless communication devices with which it is in communication. Also, notwithstanding the usage of terms such as reader devices, receiver devices, and transponder devices herein, the present invention is intended to encompass a variety of embodiments in which one or more such extender circuits are employed to facilitate communications between other wireless communication devices, regardless of whether those other wireless communication devices are transponders, receivers, or readers.

It is specifically intended that the present invention not be limited to the embodiments and illustrations contained herein, but include modified forms of those embodiments including portions of the embodiments and combinations of elements of different embodiments as come within the scope of the following claims.

I claim:

1. A system for facilitating wireless communications between a radio frequency identification (RFID) reader device and as RFID transponder device, the system having an extender circuit comprising:
    a first tank circuit including a first inductor connected in parallel with a first capacitor between first and second nodes;
    a second tank circuit including a second inductor connected in parallel with a second capacitor between third and fourth nodes;
    a first connection including a resistor, the first connection linking the first and third nodes; and
    a second connection between the second and fourth nodes, wherein the second and fourth nodes are at or substantially at a common voltage.

2. The system of claim 1, further comprising the RFID reader device, wherein the RFID reader device includes an RFID reading circuit in combination with a third tank circuit including a third inductor connected in parallel with a third capacitor, the RFID reader device being electrically disconnected from the extender circuit but capable of wirelessly communicating with at least a portion of the extender circuit.

3. The system of claim 1, further comprising the RFID transponder device, wherein the RFID transponder device includes an RFID transponder circuit in combination with a third tank circuit including at third inductor connected in parallel with a third capacitor, the RFID transponder device being electrically disconnected from the extender circuit but capable of wirelessly communicating with at least a first portion or the extender circuit.

4. The system of claim 3, further comprising the RFID reader device, wherein the RFID reader device includes an RFID reading circuit in combination with a fourth tank circuit including a fourth inductor connected in parallel with a fourth capacitor, the RFID reader device being electrically disconnected from the extender circuit but capable wirelessly communicating with at least a second portion of the extender circuit.

5. The system of claim 4, wherein the first portion includes the first tank circuit and the second portion includes the second tank circuit, wherein the third tank circuit is positioned so as to be within no more than about three (3) centimeters of the first tank circuit and the fourth tank circuit is positioned so as to be within no more than about three (3) centimeters of the second tank circuit.

6. The system of claim 4, wherein a distance between the first and second tank circuits is up to approximately 50 centimeters.

7. The system of claim 4, wherein a first inductance of the first inductor and a first capacitance of the first capacitor are chosen so that the first tank circuit is tuned to be resonant in relation to the third tank circuit, and a second inductance of the second inductor and a second capacitance of the second capacitor are chosen so that the second tank circuit is tuned to be resonant in relation to the fourth tank circuit, and wherein the first tank circuit is additionally resonant in relation to the second tank circuit.

8. The system of claim 1, wherein the first and second connections both include respective elongated wire portions, wherein the first and second connections can both be bent so that a path leading between the first and second tank circuits is non-linear.

9. The system of claim 8, wherein the path leading between the first and second tank circuits is substantially bent so that the first tank circuit is positioned substantially along a first side of a corner and the second tank is positioned substantially along a second side of a corner.

10. The system of claim 1, wherein the system is implemented in a rotating or rotatable head structure of a sensing system.

11. The system of claim 10, wherein the sensing system is a non-contact or interlocking switch that includes the rotating or rotatable head structure.

12. The system of claim 10, wherein the sensing system is configured to sense an opening or closing of a door with which the RFID transponder device is associated, or a passing of an object with which the RFID transponder device is associated past the sensing system as the object is carried by an assembly line.

13. The system of claim 1, wherein the system is implemented in a structure, and wherein the system allows for a presence or a position of the structure to be detected due to the wireless communications between the RFID reader device and the RFID transponder device, which occur via the system when the system passes in proximity to both of those devices.

14. The system of claim 13, wherein the system is configured to allow for sensing of the structure as it passes in proximity to both of the RFID reader and transponder devices as it is carried along a direction on an assembly line.

15. A sensing system comprising:
a radio frequency identification (RFID) reader or transponder device mounted on a first portion of the sensing system and including a first antenna device; and
a RFID extender circuit mounted on a second portion of the sensing system, the RFID extender circuit including second and third antenna devices coupled at least indirectly by way of a first connecting structure including a resistor, wherein the first antenna device includes a first tank circuit, wherein the second and third antenna devices include respectively second and third tank circuits, wherein each of the second and third tank circuits includes a respective inductor and a respective capacitor coupled in parallel between respective first and second nodes of a respective pair of nodes, wherein the respective first nodes of the respective pairs of nodes are coupled at least indirectly by way of the first connecting structure including the resistor and the respective second nodes of the respective pairs of nodes are also coupled at least indirectly with one another by way of a second connecting structure, so that the respective second nodes of the respective pairs of nodes are at or substantially at a common voltage;
wherein the second antenna device is capable of communicating with the first antenna device and the third antenna device is configured to communicate with an external device,
whereby the RFID reader or transponder device is able to detect a presence of the external device in proximity to the third antenna device by virtue of wireless communications between first and second antenna devices.

16. The sensing system of claim 15, wherein the second portion of the sensing system is rotatably mounted in relation to the first portion.

17. The sensing system of claim 15, wherein the second portion includes first and second surfaces on substantially opposite sides of the second portion, wherein the third tank circuit is positioned proximate the first surface, wherein the second tank circuit is positioned proximate the second surface, and wherein the second surface faces the first portion.

18. The sensing system of claim 15, wherein the second portion includes first and second surfaces on substantially opposite sides of the second portion, and also a third surface extending between the first and second surfaces, wherein the third tank circuit is positioned proximate the third surface, wherein the second tank circuit is positioned proximate the second surface, and wherein the second surface faces the first portion.

19. The sensing system of claim 18, wherein the first and second connecting structures are at least partly bent so as to link the third tank circuit positioned proximate the third surface and the second tank circuit positioned proximate the second surface.

20. The sensing system of claim 18, wherein the second portion with the RFID extender circuit positioned therewithin is capable of rotating and determining that the external device is located at one position around the second portion and not at another position around the second portion.

21. The sensing system of claim 15, wherein:
(a) the sensing system is a non-contact switch or interlock switch; or
(b) the external device is one of a door and a product moving along an assembly line.

22. A method or facilitating wireless communications between a radio frequency identification (RFID) reader device and a RFID transponder device, the method comprising:

receiving a first wireless communication signal from the RFID transponder device at a first tank circuit of a RFID extender circuit, the first tank circuit having a first pair of nodes;

communicating an electrical signal based upon the received first wireless communication signal from the first tank circuit to a second tank circuit of the RFID extender circuit, the second tank circuit having a second pair of nodes, with a respective one of the second pair of nodes of the second tank circuit being electrically coupled to a respective one of the first pair of nodes of the first tank circuit at least by way of a resistor, and with respective other nodes of the first and second pairs of nodes being short-circuited so as to be at or substantially at a common voltage; and sending a second wireless communication signal from the second tank circuit for receipt by the RFID reader device.

23. The method of claim 22, further comprising, prior to the receiving and the sending:

receiving a third wireless communication signal from the RFID reader device at the second tank circuit;

communicating a further electrical signal based upon the received third wireless communication signal from the second tank circuit to the first tank circuit electrically coupled to the second tank circuit; and sending a fourth wireless communication signal from the first tank circuit for receipt by the RFID transponder device, whereby the RFID transponder device in response generates the first wireless communication signal.

24. The method of claim 22, further comprising:

controlling a rotational orientation of a first structure with which the RFID extender circuit is associated; and rotating the first structure until the first tank circuit is sufficiently close to the RFID transponder device so that the first wireless communication signal occurs; and determining at the RFID reader device, based at least partly upon the second wireless communication signal, a presence or a rotational position of the RFID transponder device.

25. The method of claim 22, further comprising, prior to the receiving of the first wireless communication signal, either (a) moving a first structure on which the RFID extender circuit is mounted through a space between the RFID reader device and the RFID transponder device, wherein the first and second wireless communication signals occur when the first structure passes through a location within the space, or (b) moving a second structure on which the RFID transponder device is mounted in relation to the RFID extender circuit, wherein the first and second wireless communication signals occur when the second structure is within a predetermined proximity of the RFID extender circuit.

* * * * *